(12) United States Patent
Esteve et al.

(10) Patent No.: US 11,033,034 B2
(45) Date of Patent: Jun. 15, 2021

(54) CRIMPER ROLLER

(71) Applicant: General Mills, Inc., Minneapolis, MN (US)

(72) Inventors: Emilien Esteve, Baulmes (CH); Yves Marchionini, Les Paccots (CH); Pierre Vigier, Yvonand (CH)

(73) Assignee: General Mills, Inc., Minneapolis, MN (US)

(*) Notice: Subject to any disclaimer, the term of this patent is extended or adjusted under 35 U.S.C. 154(b) by 351 days.

(21) Appl. No.: 16/082,392

(22) PCT Filed: Mar. 1, 2017

(86) PCT No.: PCT/EP2017/054769
§ 371 (c)(1),
(2) Date: Sep. 5, 2018

(87) PCT Pub. No.: WO2017/153222
PCT Pub. Date: Sep. 14, 2017

(65) Prior Publication Data
US 2019/0069560 A1 Mar. 7, 2019

(30) Foreign Application Priority Data
Mar. 8, 2016 (EP) .................................... 16159180

(51) Int. Cl.
*A21C 9/00* (2006.01)
*A21C 9/06* (2006.01)
*A21C 11/10* (2006.01)

(52) U.S. Cl.
CPC .............. *A21C 9/068* (2013.01); *A21C 11/10* (2013.01)

(58) Field of Classification Search
CPC ................................ A21C 9/068; A21C 11/10
See application file for complete search history.

(56) References Cited

U.S. PATENT DOCUMENTS

| | | | | |
|---|---|---|---|---|
| 1,356,692 A | * | 10/1920 | Burton | A21C 9/068 425/184 |
| 1,479,925 A | * | 1/1924 | Oleri | A21C 9/068 425/298 |
| 1,844,142 A | * | 2/1932 | Barili | A21C 9/066 99/450.2 |
| 2,227,728 A | * | 1/1941 | Lombi | A21C 9/066 99/450.2 |

(Continued)

FOREIGN PATENT DOCUMENTS

| | | | | |
|---|---|---|---|---|
| CH | 212635 A | * | 12/1940 | A21C 9/066 |
| CH | 364231 | | 9/1962 | |

(Continued)

OTHER PUBLICATIONS

European Search Report from EP 16 15 9180 dated Aug. 16, 2016.

*Primary Examiner* — Timothy Kennedy
(74) *Attorney, Agent, or Firm* — Diederiks & Whitelaw, PLC; Gregory P. Kaihoi, Esq.

(57) ABSTRACT

The present invention concerns an apparatus and method utilizing a crimping roller which itself comprises a plurality of radially extending separating blades, with each blade comprising a central triangular cutting edge and two sealing portions extending from opposing sides of the base of the triangular cutting edge.

14 Claims, 10 Drawing Sheets

(56) References Cited

U.S. PATENT DOCUMENTS

| | | | | |
|---|---|---|---|---|
| 2,714,861 | A | * | 8/1955 | Castronuovo ............. A23L 7/11 |
| | | | | 99/450.4 |
| 2,774,313 | A | * | 12/1956 | Lombi ................... A21C 9/066 |
| | | | | 99/450.2 |
| 3,186,362 | A | * | 6/1965 | Iannuzzi, Sr. .......... A21C 9/068 |
| | | | | 425/298 |
| 3,279,398 | A | | 10/1966 | Weiss |
| D240,288 | S | * | 6/1976 | Wright ........................... D7/672 |
| 4,381,906 | A | * | 5/1983 | Mancini ................ A21C 9/066 |
| | | | | 425/106 |
| 4,606,126 | A | * | 8/1986 | Davis .................... A21C 11/22 |
| | | | | 30/307 |
| 4,780,329 | A | * | 10/1988 | D'Alterio .............. A21C 11/08 |
| | | | | 426/144 |
| 6,230,613 | B1 | * | 5/2001 | Porcari .................. A21C 9/066 |
| | | | | 425/112 |
| 2004/0175453 | A1 | * | 9/2004 | Baeten .................. A21C 11/16 |
| | | | | 425/289 |
| 2013/0008034 | A1 | * | 1/2013 | Mizer .................... A21C 3/021 |
| | | | | 30/279.2 |

FOREIGN PATENT DOCUMENTS

| | | | | | |
|---|---|---|---|---|---|
| DE | | 3733049 | A1 * | 4/1989 | ............ B26B 27/00 |
| EP | | 0179656 | | 4/1986 | |
| EP | | 0447367 | A1 * | 9/1991 | ............ A21C 9/066 |
| EP | | 0693255 | | 1/1996 | |
| FR | | 632820 | A * | 1/1928 | ............ A21C 9/068 |
| GB | | 190222501 | A * | 1/1903 | |
| NL | | 40987 | | 5/1937 | |

\* cited by examiner

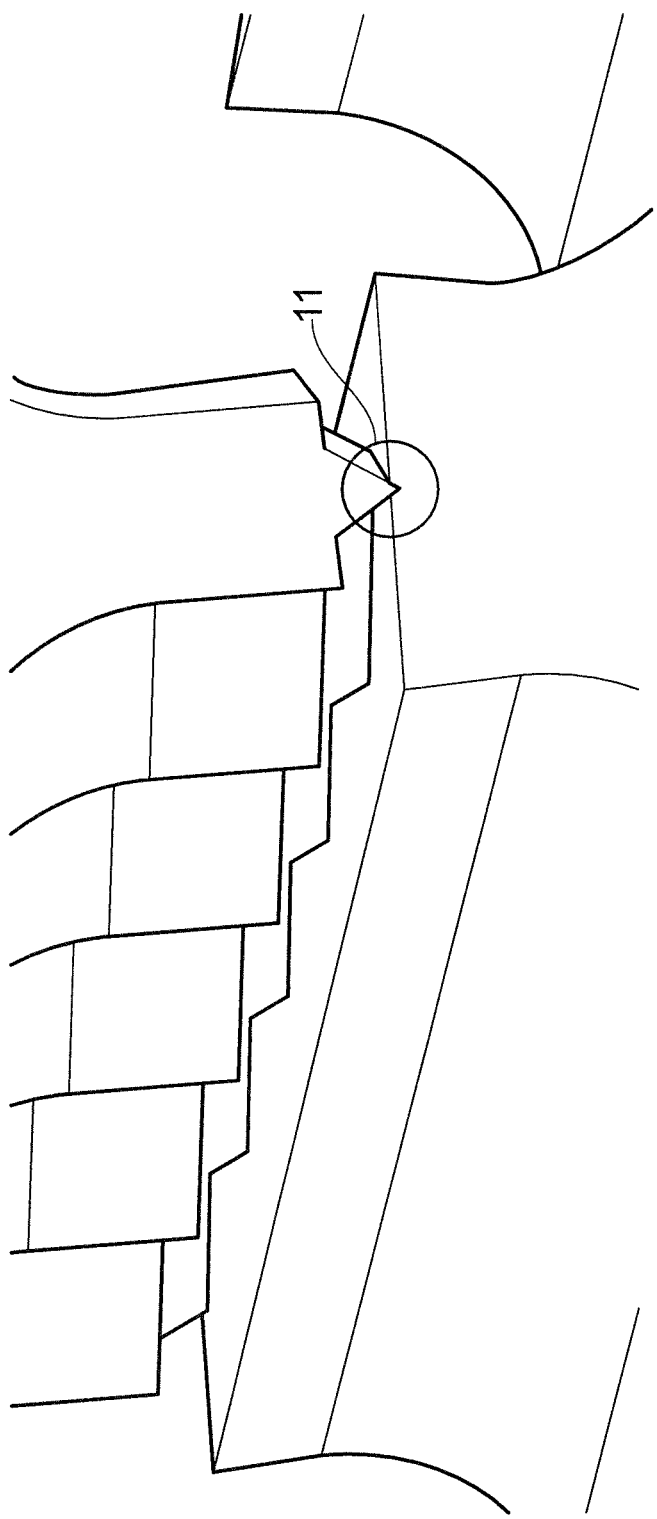

CRIMPER ROLLER

CROSS REFERENCE TO RELATED APPLICATIONS

This application represents a National Stage application of PCT/EP2017/054769 filed Mar. 1, 2017 and titled "Crimper Roller".

TECHNICAL FIELD

The invention relates to a co-extruded food product separating apparatus. In particular, but not exclusively, the invention relates to a machine and method of separating a flow of co-extruded foodstuff into discrete parcels or 'pillows' as they are known in the art. Such pillows may, for example, be a breakfast cereal.

BACKGROUND

Food products such as breakfast cereals are commonly formed of a plurality of discrete (that is individual) parcels or pillows which a consumer can eat for example with milk.

Numerous types of breakfast cereal exist and can be produced by moulding and cooking the cereal before packaging for consumer delivery.

Particular care is taken in determining the cooking parameters to ensure that the product is palatable to the consumer and has a good shelf life.

However, as breakfast cereals become more sophisticated, it has become more and more difficult to manufacture satisfactory products that the consumer finds appealing to eat in terms of both taste and texture, whilst simultaneously allowing for high production rates and low material waste. These final two points reduce the costs of manufacturing the product.

The present invention advantageously allows a new type of co-extruded breakfast cereal to be manufactured which allows for high production rates whilst optimizing the geometry of each parcel to achieve a highly desirable texture to the product for the consumer.

The invention functions in such a way that there is little waste product and no further treatment of wastes. This improves material usage and allows for economical production. The apparatus and method also create robust parcels of food product with secure seals which enhances shelf-life.

The term 'co-extruded' is used herein to refer to a type of breakfast cereal in which a pair of foodstuff ingredients are simultaneously extruded into a single flow or 'rope'.

Specifically, the extruder used in conjunction with the present invention forms a flow of ingredient with an outer periphery and an inner core i.e. a flow of ingredients with one ingredient surrounding the other ingredient or a hollow pillow.

It is therefore an object of the invention to provide a manufacturing apparatus and method that allows a co-extruded breakfast cereal to be economically manufactured at high production rates and yet still achieves a desirable distribution of hardness and softness throughout each of the parcels.

SUMMARY OF THE INVENTION

In a first aspect of the invention there is provided a co-extruded food product separating apparatus comprising a separating roller having a circular outer forming surface and a plurality of radially extending separating blades, each separating blade extending across a width of the separating roller, wherein each separating blade comprises a central triangular cutting edge and two sealing portions extending from opposing sides of the base of the triangular cutting edge.

Thus, a separating apparatus according to the invention performs two simultaneous actions as a co-extruded food product passes over the separating apparatus; namely to securely separate adjoining food products and to seal peripheral edges of adjacent food products passing through the separation apparatus.

The food product is separated into discrete parcels or 'pillows' as they are sometimes described. The term 'pillow' is intended to describe the narrow, generally flat perimeter of the parcel a central bulbous or convex centre. The shape of the pillow may vary according to the process that is used.

Advantageously the triangular cutting edge cooperates with the pair of sealing portions to achieve the simultaneous actions in a highly effective manner. Specifically, the triangular arrangement of the cutting edge applies a high pressure to the food product material to commence the separation. The angled sides of the triangle extending from the apex of the triangle act to force the adjacent food products apart and cause food material to be directed towards the two sealing portions which extend from opposing sides of the base of the triangular cutting edge.

As the triangle initiates the cutting action the sealing portions simultaneously begin to compress a region of the food product immediately adjacent to the cut. Because of the configuration of the triangle and the position of the sealing portions at the base of that triangle i.e. spaced for the apex of the triangle the food material which is displaced by the movement of the triangle is conveniently compressed by movement of the sealing portions to create a seal running parallel with the line of the cut.

Thus, according to the invention a simultaneous cut and seal can be achieved with minimal material wastage, not least because of the arrangement of the triangle and sealing surfaces which incorporate displaced food material into the seal.

Furthermore, because the separating blade comprising the triangular cutting edge and sealing portions is arranged in the form of a roller the apparatus can operate continuously to achieve high production rates for separated and sealed food products. This, combined with the low food product wastage that the apparatus achieves is highly advantageous in the food manufacturing industry.

The term 'co-extruded' used herein refers to a process where a pair of food ingredients are simultaneously extruded. The foodstuffs may be extruded as a homogeneous blend or, more advantageously, they may be extruded such that one foodstuff surrounds a second foodstuff i.e. the co-extrusion comprises an outer layer and an inner cored.

Conventional co-extrusion machines (as are known in the art) extrude the food material in the form of a continuous tube or flow of food material. The tube can be transported away from the extruder using a conveyor belt apparatus having a speed matching that of the output speed of the co-extruder.

The radially extending separating blades are advantageously located on the periphery of a circular ring which can be conveniently rotated using conventional motors.

The separating blades are continuous in the sense that the blade itself is not interrupted i.e. there are no gaps or spaces along the length of the blade extending across at least part of the width of the roller, advantageously the entire width.

The blades have a non-linear profile i.e. the blades are not exclusively parallel with the rotational axis of the roller. Specifically, the blades may be arranged in a 'zig-zag' or serrated profile i.e. portions of the blade extend in alternative directions like the edge of a serrated knife.

A zig-zag or serrated blade creates a corresponding zig-zag or serrated separation line. Furthermore, because of the sealing portions extending from the central triangular portion of the invention a corresponding zig-zag or serrated seal is formed immediately adjacent to the separation line. This advantageously improves the sealing properties of the food product because the seal accurately follows the separation line and does not consume unnecessary material to create the seal. The sealing region is optimized.

The cutting edge itself is advantageously located at a central position of the blade and follows the predetermined zig-zag or serrated profile. Thus, a uniform parcels can be separated in a continuous process with equal sealing portions on either side of the line of separation.

The portions forming the serrated or zig-zag edge may have any suitable angle between adjacent portions of the blade. However, the inventors have established that angles of between 90 degrees and 150 degrees provide a food parcel with a superior texture/hardness to the consumer. Specifically, it is has been established that this angular range creates a food parcel with sufficient hardness to be desirably to eat whilst not being too hard to cause discomfort to chew. The angles of the serrations or zig-zag created by the roller achieve a desirable product for the consumer. Beyond or below this angular range either creates an edge that is too hard or too soft or, equally importantly, that is difficult to seal without using additional food material.

Similarly the inventors have established that if the radial extension of the triangular cutting edge, measured outwards from the base of the triangle, is between 0.5 mm and 2.5 mm a superior edible product can be formed. This range causes sufficient material to be laterally displaced during the separation step to create an effective seal whilst simultaneously separating two adjacent parcels.

The inventors have also established that the lateral extension of the two sealing portions contributes to the advantages of the manufacturing process of the invention. Specifically, it is advantageous that the two sealing portions extending from the base of the triangular cutting edge extend between 0.2 mm and 2 mm from the point at which each sealing portion intersects with the base of the triangular cutting edge.

The intersection may be a single point where the angle of the triangular surface intersects with the sealing surface. Alternatively a radius i.e. a curve may be provided between the two surfaces so as to prevent food-stuff adhering to either or both surface. It will be recognized that a smooth surface will allow the food parcel to separate from the blade surface more easily when a radius is used.

The sealing surface and the side of the triangular surface may meet at any suitable angle. However, it has been established that an angle within the range of 70 to 150 degrees optimizes the manufacturing process by providing a reliable seal and optimizes the resultant product for the consumer.

The preferred radius are about 80 mm to 200 mm in order to have a greater interaction time between the rope and the rollers thereby allowing better forming and sealing of the pillows.

The two sealing surfaces on either side of the triangular surface of the blade may advantageously be perpendicular to the triangular cutting edge from an angle measured from the rotational axis of the roller through the centre line of the triangular cutting edge.

Perpendicular sealing surface optimize the compression of the seal around the food parcel during the cutting and compression process. This allows for improved sealing on the pillows enhancing the quality of the product.

Advantageously the angle between each side face of the triangular cutting edge is between 30 degrees and 120 degrees i.e the angle of the apex of the triangular cutting blade.

The invention may also advantageously comprise a second roller against which the first separating roller can rotate. The purpose of the second roller is to provide a cutting surface against which the blades of the first roller can engage to cause the separation of parcels and the simultaneous sealing of consecutive parcels.

Advantageously the two rollers are arranged to rotate in opposing directions and at equal rotational speeds so as to prevent shear forces being applied to the co-extruded food tube or rope. Optimally the speed of rotation of the pair of rollers is such that the peripheral speed of the rollers (the point at which the separation and sealing occurs) is substantially equal to the linear speed of the co-extruded flow leaving the co-extruder. This allows for a stable continuous manufacturing process in which parcels are optimally processed i.e. separated and sealed.

The pair of rollers are separated (i.e. the centres of rotation are spaced) by a distance that is equal to or less than the sum of the outer radius of the second roller and the outer radius of the separating roller measured to the tip of a triangular cutting edge. This separation ensures that the blades come into close contact with the cutting surfaces of the second roller to create the cut and sealing process. If the separation of the two rollers is less than the sum of the distance between the outer radius of the second roller and the outer radius of the separating roller (measured to the tip of the triangular cutting edge) then the cutting edge penetrates the surface of the contact surface.

The distance between the rollers may be optionally selectable by the operative according to the specific geometries of the parcels to be produces. This can be achieved by physical movement of the centres of rotation of the pair of rollers.

In such an arrangement the second roller may be provided with a surface that is deformable so as to receive the separating roller blades and then return to a normal position. For example, the second roller may be provided with a surface made of rubber or any other deformable material.

The first separating roller may be formed of a harder material, such as stainless steel. The first and second rollers may be formed of dissimilar materials and specifically only one roller may be formed of a metal. This prevents metal to metal contact which could cause wear and/or metallic debris which could be discharged into the food product.

A manufacturing apparatus according to the invention may additionally be provided with a foodstuff feed-line arranged in use to feed a stream of foodstuff between the rollers (as described above) and to cause the separating roller and second roller to rotate in opposite directions with respect to one another to cause the stream of foodstuff to pass over the separating blades.

Thus a manufacturing apparatus is provided that can continuously produce food parcels with efficient separation and seals. Because of the pair of rollers it will be appreciated that the apparatus can produce the parcels continuously as opposed to a batch type process using a moulding machine.

Viewed from another aspect there is provided a method of manufacturing a co-extruded food product comprising the step of supplying a stream of food product between a pair of opposing rollers of an apparatus as described herein to form a plurality of individual food items from the stream of food product.

More specifically, another aspect of an invention described here relates to a method of manufacturing a breakfast cereal of discrete parcels, each parcel being formed from a co-extruded edible food flow and each parcel having opposing ends that are cut and sealed by a pair of opposing rollers described herein.

Thus, an edible food product can be produced which has distinctive non-linear texture throughout each of the discrete product parcels. Specifically, owing to the zig-zag or serrated nature of the way adjacent parcels are separated in conjunction with the co-extruded origin of the food ingredients in the form of a tubular flow a distinctive edible produce can be manufactured with harder or 'crunchy' ends and softer side walls. Such a product is appealing to the consumer since is provides an unusual texture when eaten. The present invention permits such a product to be manufactured at high production rates and with minimal material wastage. This increases manufacturing efficiency and energy consumption which provides for a more economical product for the consumer.

Viewed from yet another aspect there is provided a co-extruded cereal manufacturing apparatus comprising a pair of opposing rollers which are arranged in use to rotate in opposing directions, at least one of said rollers comprising a plurality of cutting blades configured to cut a stream of foodstuff into a plurality of discrete parcels, wherein each cutting blade comprises:
(a) a first radially extending portion defining a cutting edge arranged in use to cut and separate adjacent parcels; and
(b) a pair of circumferentially extending edges on opposing sides of the first radially extending portion arranged in use to compress the foodstuff along an edge of the parcel to create a seal;
and wherein each cutting blade has portions arranged at alternating angles creating a non-linear cut and seal for each of said parcels.

As described above, such an apparatus allows for the continuous production of a plurality of edible food parcels, each parcel having a distinctive non-linear hardness. Specifically, the ends of each parcel at which the separation and seal is formed are harder than the central 'body' of each parcel. The non-linear separating line (the zig-zag) enhances the harder ends of the product (these portions being compressed compared to the central body of the parcel) to provide each parcel with a distinctive edible characteristic.

The second roller described herein is configured to provide a surface, or surfaces, against which the blades of the separating roller may engage to cause the cutting and sealing operation (the simultaneous cutting and sealing operation).

The second roller may comprise a continuous outer surface against which the separating roller may rotate to effect the separation and sealing. Advantageously the second roller may be provided with a plurality of contact surfaces extending radially from the radius of the second roller so as to provide a plurality of surfaces against which the separation roller blades may engage.

Specifically the second roller is configured, in cooperation with the first separating roller, such that as the two rollers rotate (in opposing directions) the blades of the first roller align with the contact surfaces of the second roller such that the second roller provides a plurality of surfaces against which the blades of the first roller can come into contact with. Thus, the separation and seals can be formed.

Furthermore, the spaces defined between the plurality of blades on the periphery of the separating roller and the plurality of contact surfaces on the periphery of the second roller may define forming spaces/dynamic chambers i.e. spaces or chambers that are formed between the blades and cutting surfaces as the two rollers rotate against each other. The chambers are 'dynamic' in the sense that they are formed as the blades and contact surfaces come together for consecutive blades and cutting surfaces around the rollers.

Each chamber may be provided with a surface profile corresponding to the desires outer surface profile of the parcel. By machining each of the rollers a so-called "mould" may be formed causing the co-extruded food material to be pressed against the surface of the separating roller and second roller in each of the said chambers so as to create an outer topography or profile to each of the parcels.

Thus, parcels may be continuously manufactured comprising the serrated ends described above (with their associated hardness or 'crunch') and central parcel body with is softer than the parcel ends and which could have a surface topography mirroring that of the outer surfaces of the pair of rollers by adapting the height and design of the chamber (the surfaces of the chamber created between adjacent blades and cutting surfaces as described above).

It will be recognized that with a co-extruded food stream (i.e. a tubular flow) the pair of rollers need not comprise side-walls since the ends of the tube are 'crimped' by the cutting and sealing operation of the invention. The sides of each parcel are un-interrupted in the manufacturing process such that the parcels have a smooth out periphery and two opposing crimped and sealed ends at either end (as illustrated in FIG. 9).

It should be appreciated that the manufacturing apparatus and method described herein has established a means to manufacture a cereal type product that has distinctive non-uniform hardness which is appealing to the consumer. Furthermore, the process minimizes material wastage because of the way the separation and seals are formed in a continuous non-batch way. This minimizes manufacturing cost and environmental cost of manufacture.

It should also be recognized that the process may equally be applied to other edible products including savoury or sweet snacks or animal products such as pet foods.

BRIEF DESCRIPTION OF THE DRAWINGS

Embodiment of the invention will now be described by way of example with reference to the following figures.

In accordance with one (or more) embodiments of the present invention the Figures show the following:

FIG. 6 shows an embodiment of the invention in which the teeth or blades of the crimping roller penetrate the second roller;

Any reference to prior art documents in this specification is not to be considered an admission that such prior art is widely known or forms part of the common general knowledge in the field.

As used in this specification, the words "comprises", "comprising", and similar words, are not to be interpreted in an exclusive or exhaustive sense. In other words, they are intended to mean "including, but not limited to".

The invention is further described with reference to the following examples. It will be appreciated that the invention as claimed is not intended to be limited in any way by these examples.

DETAILED DESCRIPTION

Figure 1:
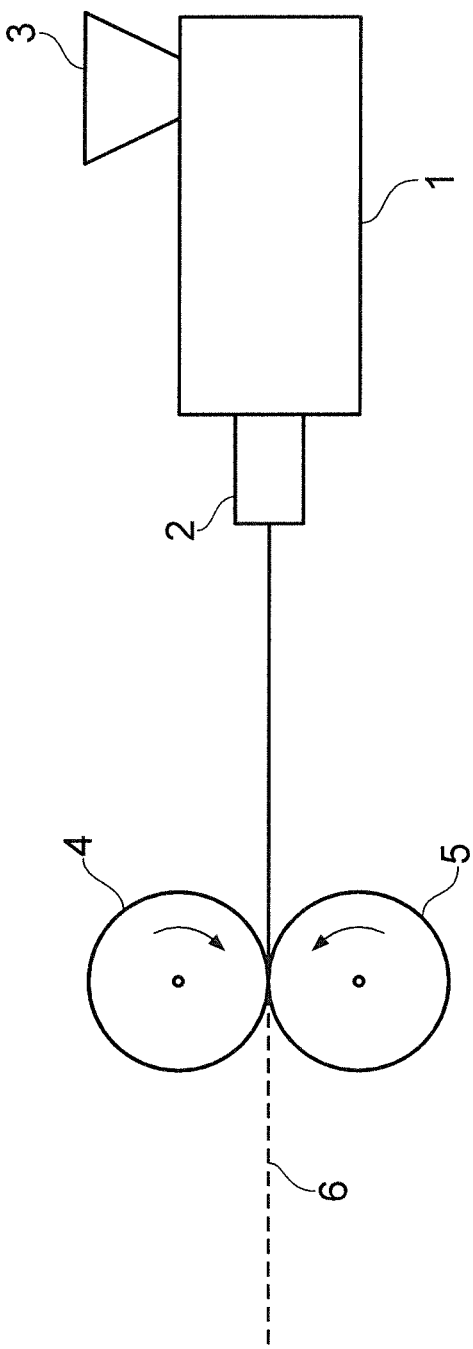
FIG. 1 shows a schematic of the manufacturing apparatus according to an embodiment of the invention.

FIG. 1 is a schematic of the manufacturing apparatus according to an embodiment of the invention.

The invention is generally concerned (but not limited to) the manufacture of a food product formed of a plurality of individual parcels; flakes or pillows. An example of a product of this general type is a breakfast cereal such as Nestlé Chocapic® Coeur fondant containing cereal flakes and pillows (manufactured by Nestle) which is provided as a plurality of flakes which the consumer pours into a bowl.

The apparatus and method of the present invention is not concerned with flakes but instead with parcels or pillows which have an outer edible layer surrounding an inner edible or hollow core.

As shown in FIG. 1, the manufacturing apparatus incorporating the invention comprises an extruding machine. Such machines are commercially available and manufactured by, for example, Bühler of Utzwil (Switzerland). The extruding machine is equipped with a co-extruder die head (2) which discharges a continuous tube or 'rope' of co-extruded food.

The internal operation of the extruding machine is well understood in the art but put simply: components formed as recipes are loaded into the extruder by means of a hopper 3 (or other supply means) and the materials are processed internally to form the extruded tube or rope.

In a co-extruding process relevant to the present invention, generally two different components are introduced into the extruder and are processed such that the extruded tubular output from the co-extruder has one of the components forming an outer layer and the second component contained within the outer layer and forming a core to the tube or rope.

In an alternative, the co-extruded product may comprise an edible layer and a hollow core. In this case, only one component is supplied to the extruder.

FIG. 1 also shows the crimping roller 4 of the invention and an opposing second roller 5. The crimping roller 4 and second roller 5 are rotatable mounted and arranged to rotate in opposing directions as shown by the arrows in FIG. 1.

The crimping roller 4 and second roller 5 have rotational centres that are spaced apart by a predetermined distance which is discussed further below.

In operation the co-extruder generates the tube or rope comprising the outer layer and inner core which is conveyed by a conveyor belt (or other suitable means—not shown) so as to pass into between the crimping roller 4 and second roller 5.

The rollers are configured to rotate such that the peripheral speed of each roller is substantially the same as the linear flow speed of the co-extruded rope passing between the two rollers. The rollers may be arranged to rotate by a conventional drive means.

As the tube passes between the two rollers, the rollers are simultaneously rotating and the tube is crimped and divided into a plurality of discrete parcels or pillows 6.

The term 'crimped' refers to the compression that leads to the sealing of the tube. It usually leads to a separation, but does not consistently and reliably cause separation.

The distinction between cutting and crimping should be recognized. Cutting is purely separating the tube into separate portions i.e. cut but not sealed resulting in an 'open end' to the tube.

Conversely crimping according to the present invention is a combination or hybrid of cutting and sealing in a simultaneous process. Doing so allows a zig-zag shape to be formed.

The parcels or pillows 6 can be conveyed away from the rollers, again using a suitable conveyor belt or the like (not shown).

Specific details of the crimping and sealing operation that occurs between the opposing rollers will now be described.

Figure 2:
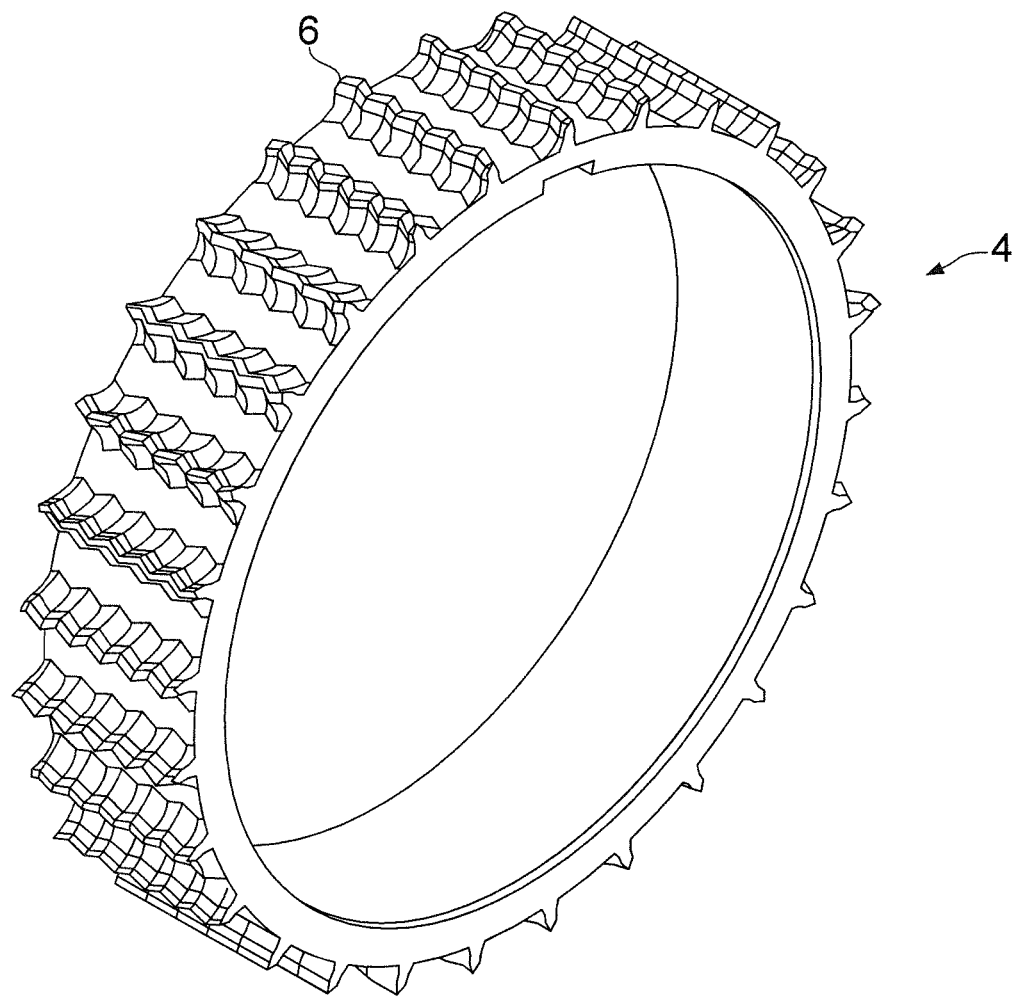
FIG. 2 shows a crimping roller according to an embodiment of the invention.

FIG. 2 shows a crimping roller 4 according to the invention.

The crimping roller is in the form of a circular disc extending in an axial direction to form a ring with an outer surface. The outer surface is provided with a plurality of radially extending separating blades 6 positioned on the outer surface of the ring.

The total number of blades 6 and the spacing between adjacent blades depends on the size of the parcels that are to be manufactured and the desired speed of manufacture.

The blades 6 will now be described in more detail with reference to FIG. 3.

Figure 3:
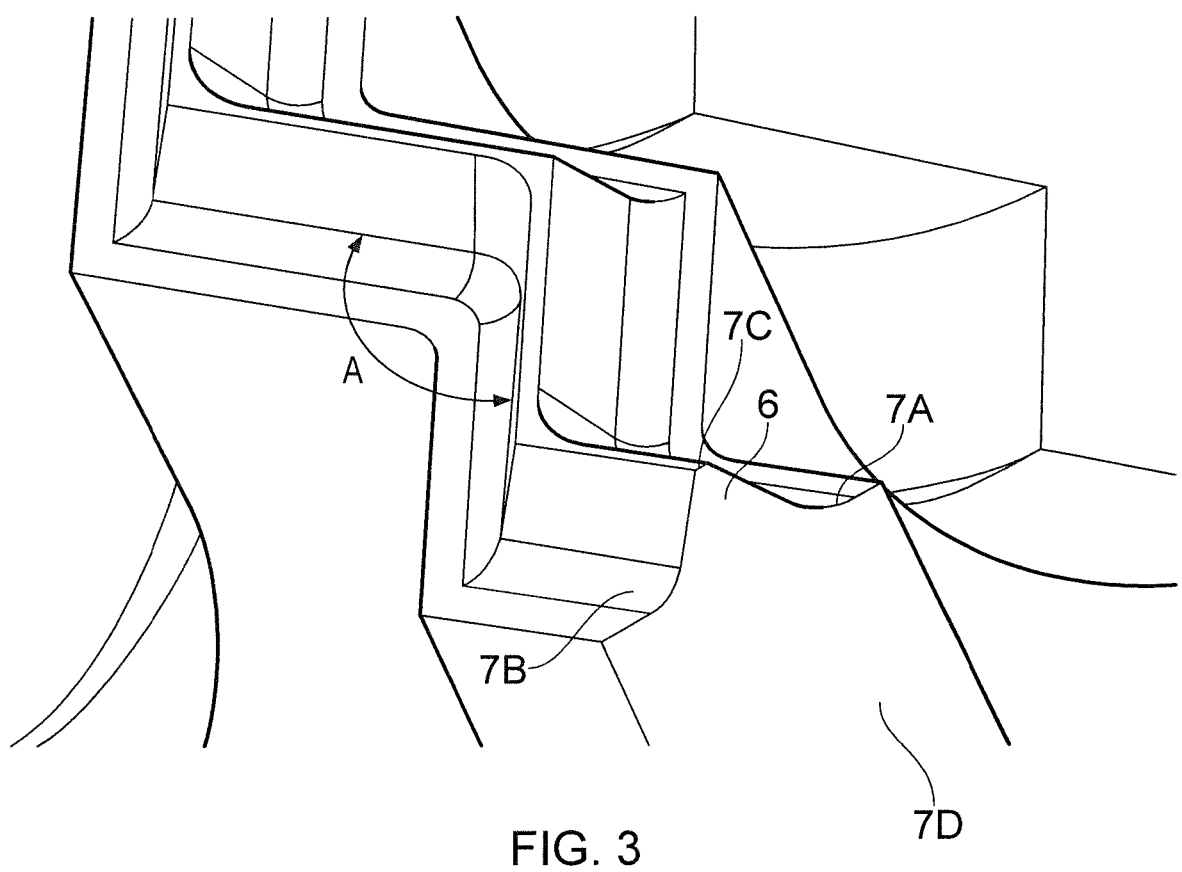
FIG. 3 shows a single cutting tooth or blade of the crimping roller of FIG. 2.

FIG. 3 is a close up view of a single blade of the crimping roller shown in FIG. 2.

Each blade comprises 3 sub-portions when looking at the blade in cross-section:
 a pair of sealing surfaces for sealing the edges of adjacent parcels;
 a blade tip and triangle for causing cutting and separation of adjacent parcels; and
 a root portion extending from the outer surface of the roller shown in FIG. 2 to the base of the triangle.

Starting from the most distal part of the blade (measured from the centre of the crimping roller) the tip 7C defines the outer most portion of the blade defining the cutting edge of the crimping roller. As shown the tip is the upper part of a triangle which extends to intersect with a pair of opposing sealing portions 7A and 7B.

The tip may be a sharp edge but is advantageously truncated i.e. flat at the top to reduce the danger of operator injury when maintaining the machinery and for food safety reasons. Also, the truncated tip enhances the seal which is generated between adjacent parcels.

The sealing portions 7A and 7B, as illustrated in FIG. 3, intersect with the sides of the triangle extending from the tip towards the sealing portions. At the intersection of sealing portions and triangle surfaces a small radius may be provided which prevents the co-extruded tube from adhering to each of the teeth.

The root portion 7D spaces the base of the triangle and sealing surfaces from the outer surface of the crimping roller shown in FIG. 2.

The height of the root portion i.e. the length measured from the crimping roller surface to the base of the triangle shown in FIG. 3 is determined by the desired position of the seal along either side of the cut between adjacent parcels. Consequently this distance is variable.

FIG. 3 also shows the zig-zag profile of each blade as viewed across the width of the roller. As shown each blade 6 is in the form of a zig-zag or serrated shape with the length of the blade being divided into portions at alternating angles shown by reference sign A. The angle A may range between 90 degrees and 150 degrees.

Adjacent portions of the blade extend either in a first circumferential direction of the roller or a second opposing direction of the roller. As can be seen in FIG. 3 the root portion 7D, sealing surfaces 7A, 7B and tip 7C all follow the same zig-zag or serrated path across the width of the crimping roller.

The zig-zag extends across the width of the crimping roller. The width of the roller is dependent on the size of the parcels/pillows to be manufactured. For example, the roller may have a width which is a multiple of the diameter of the tube, by making the width a multiple the roller does not require and side walls. It also allows for lateral movement of the tube as it moves from the extruder to the rollers. Making the roller several times wider than the tube allows the tube to move around freely without falling from the sides of the roller.

The number of alternating portions forming each blade and the angle A between each adjacent portion is dependent on the desired geometry of the edge of the parcel/pillow to be manufactured. The angle A of each blade portion defines the angle of the serrations or zig-zags forming the two opposing edges that are created by the crimping roller.

The geometry of the tip and sealing surfaces is discussed in more detail with reference to FIG. 8.

Figure 4:
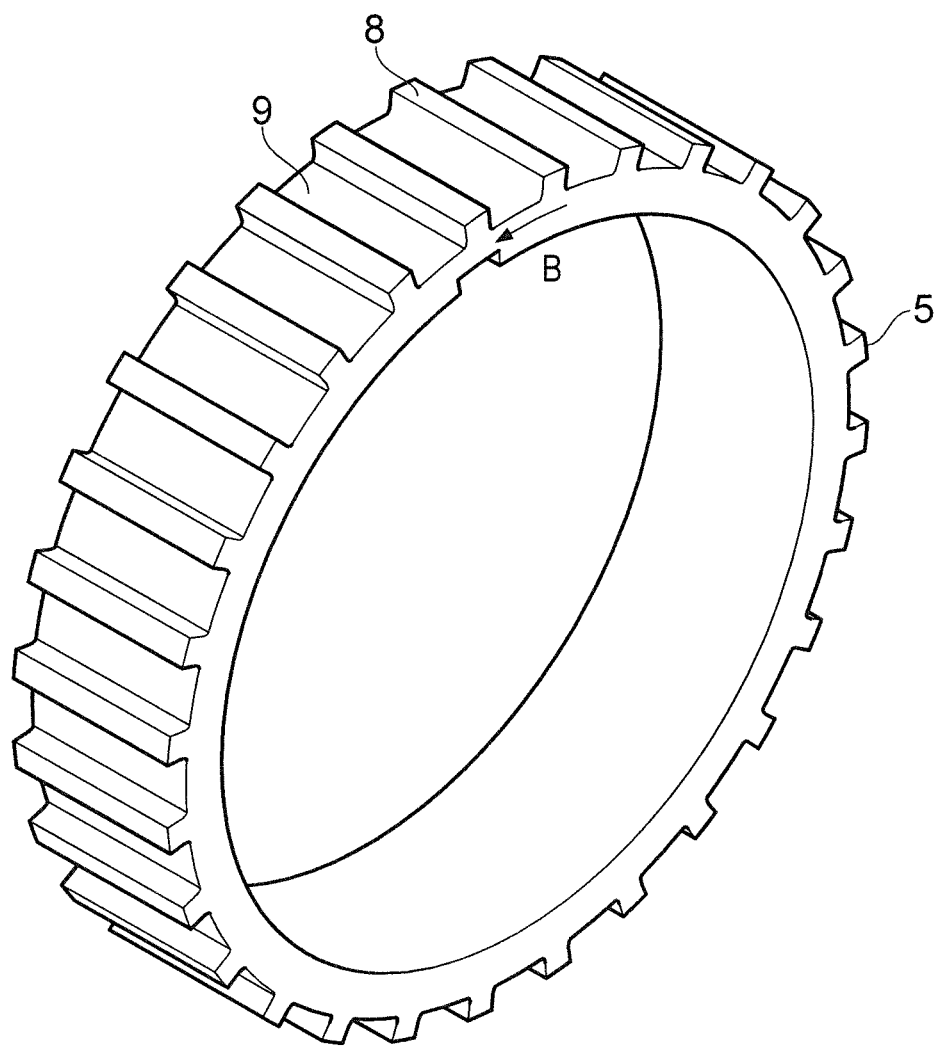
FIG. 4 shows a second roller for rolling contact with the crimping roller of FIG. 2.

As discussed above with reference to FIG. 1, the crimping roller 4 is arranged to rotate against an opposing second roller 5 as shown in FIG. 4.

FIG. 4 shows an embodiment of an opposing roller with a plurality of contact surfaces 8 arranged around the periphery of the roller 5. The surfaces 8 all located on the same radius from the central axis of the second roller thereby defining uniform surfaces which can contact the blades of the crimping roller (discussed below).

The portions 9 between each adjacent cutting portion have a profile mirroring the surfaces between adjacent blades on the crimping roller. Similarly the height of each cutting portion 8 measured from the surface 9 can be selected to correspond to the height of the base portion described above with reference to the blades. Thus, a parcel can be created with mirrored upper and lower surfaces (as described below).

In another embodiment the roller may have a continuously smooth outer surface i.e. a single continuous cutting surface as opposed to a plurality of individual and discrete surfaces shown in FIG. 4. This would result in parcels substantially flat on one side and bulbous or convex on the opposing side.

The plurality of cutting surfaces 8 as shown in FIG. 4 are spaced at circumferential spacings B corresponding to the circumferential spacings of the blades on the opposing crimping roller.

In use, the crimping roller and opposing roller are configured such that as the two rollers rotate the blades 6 align with the centres of the cutting surfaces 8, as described further below.

The crimping roller and second roller may be formed of different materials. For example, the crimping roller may be formed of a stainless steel (or other non-corroding material) and the opposing second roller of a non-metallic material. Such a material combination advantageously prevents metal-to-metal contact which could contaminate food or result in metal fragments being created and deposited in food. It furthermore prevents wear and additionally allows for deformation of the second roller when in contact with the crimping roller (as discussed below).

In an alternative arrangement two plastic material could be used, the crimping roller having a hardness greater than that of the second roller.

The crimping roller and second roller may advantageously be geared together such that rotation of one automatically caused rotation of the second. This avoids the need for accurate rotational control of the two rollers independently.

Figure 5:
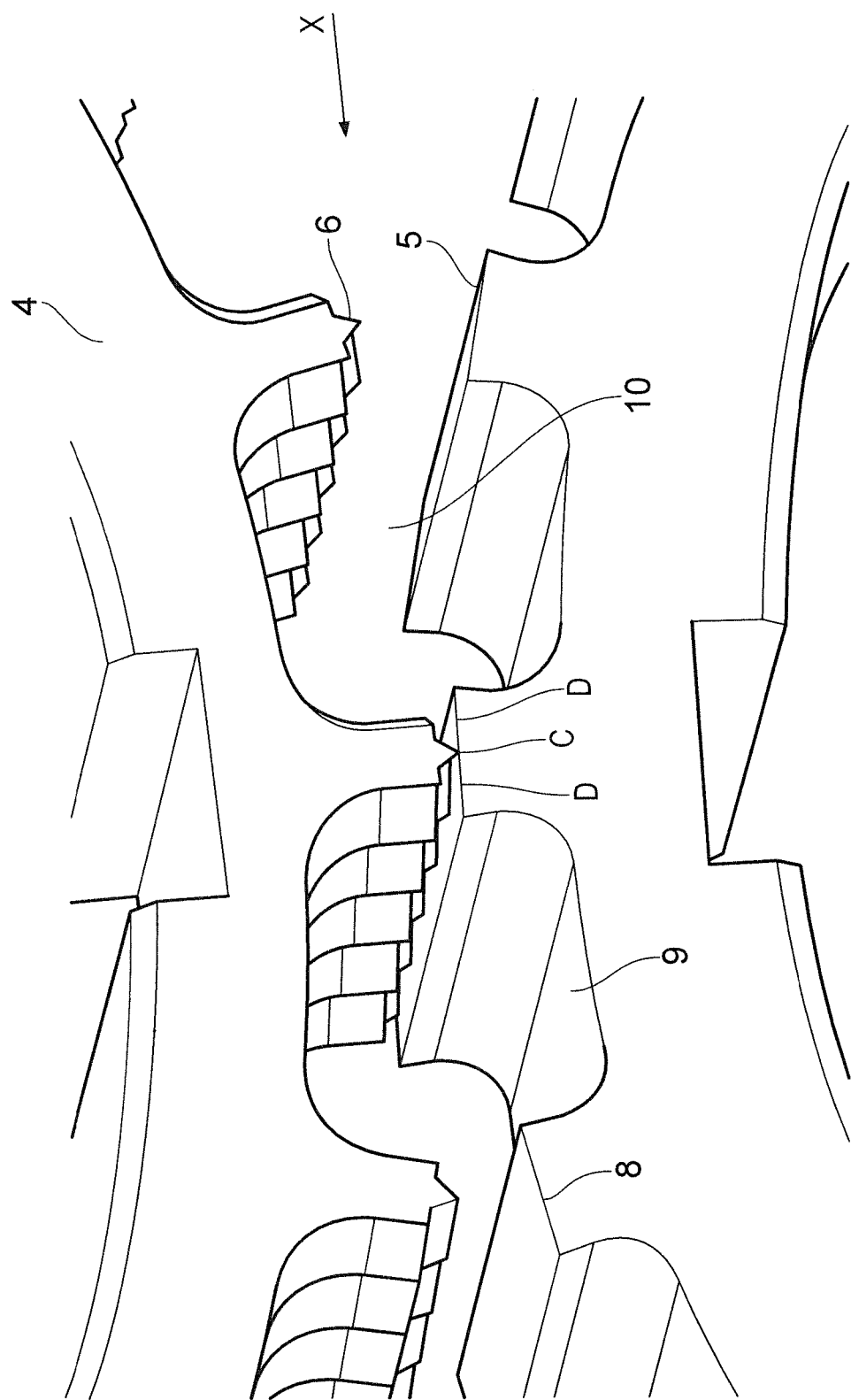
FIG. 5 shows the crimping roller and second roller in rotational contact.

FIGS. 5 and 6 illustrate the interaction between the blades of the crimping roller and the cutting surfaces of the second roller in more detail.

As shown in FIG. 5 as the two opposing rollers rotate consecutive blades 6 align with opposing and consecutive cutting surfaces 8 of the second roller.

As rotation occurs adjacent crimping roller blades and second roller cutting surfaces create a forming chamber 10 which moves as the two roller rotate.

During production of the parcels the co-extruded tube of edible material is fed between the two rollers along the direction X shown in FIG. 5.

As the co-extruded tube moves along the X axis shown in FIG. 5 it will be recognized that the blades 6 of the crimping roller 4 and the cutting surfaces 8 of the second roller 5 come together at point C (the cutting line) as they rotate in their opposing directions. As this rotation happens the tube of co-extruded material is compressed and crimped between the blade and the cutting surface.

Because the tips of the blades are brought into actual contact (or very close contact) with the cutting surface, a line along corresponding to the selected shape of the tip is compressed and cut causing the tube of co-extruded material to be divided through the crimping action at point C.

The cut i.e. the separation, is caused by the tip compressing the food material against the cutting surface.

Simultaneously, two other processing steps occur.

First, (referring to FIG. 3) the two sealing surfaces 7A, 7B compress the co-extruded tube against the cutting roller. The sealing surfaces are spaced radially from the tip and so instead of cutting the tube the material is instead compressed along two lines D on either side of the cut C. The compression creates a seal running along either side of the cut and having the same zig-zag/serrated profile.

Thus, a cut and seal are formed with a predetermined shape corresponding to that chosen by the geometry of the blades.

Secondly, rotation of the two rollers define consecutive forming chambers 10 which are bound at either end (along the X axis) by consecutive blades and cutting surfaces. As the rollers rotate, and as the co-extruded tube moves along the X axis, the tube is compressed (i.e. sealed) within the chamber.

It should be noted from FIGS. 2, 4, 5 and 6 that the crimping roller and second roller have no walls defining sides to the chambers 10. This allows the co-extruded tube entering along axis X to expand in a direction parallel with the rotational axes of the two opposing rollers when the rollers are operating in a 'moulding' mode i.e. when the rollers are configured to create surface profiles on either side of the pillows.

However, in a normal mode of operation the chambers 10 may be configured so that the outer surface of the pillows is not compressed; this allows a rounded pillow to be created.

Figure 9:
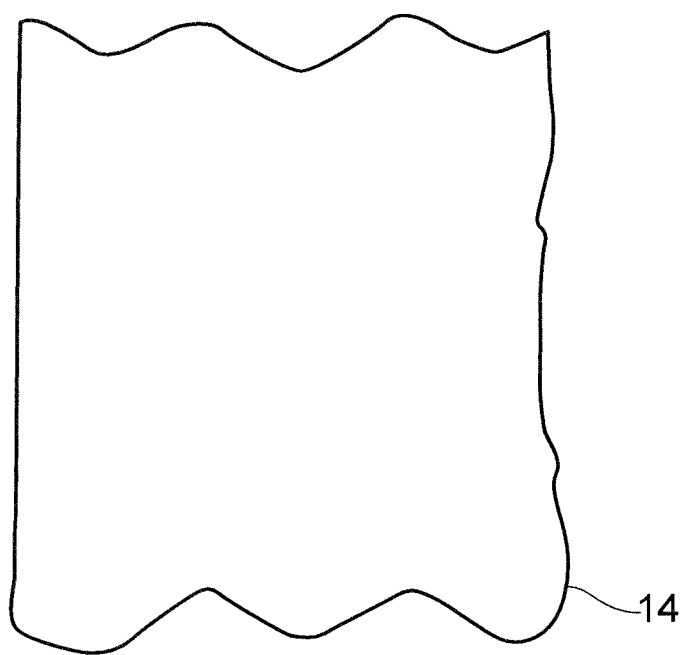
FIG. 9 shows a breakfast cereal parcel or pillow manufactured according to the apparatus and method of the invention.

In a moulding mode of operation the tube is compressed into a generally oval or pillow shape by compression within the chambers and is then sealed and cut and either end (measured in the x-axis direction) to create a parcel or pillow. Each parcel or pillow is formed with two opposing ends having profiles corresponding to the blade profile and an outer profile mirroring the chamber profile. This is illustrated in FIG. 9.

FIG. 6 shows an embodiment of the invention in which the separation of the opposing rollers has been reduced such that the tip of the blade penetrates the cutting surface as show by reference numeral 11. This embodiment increased the effectiveness of the cutting tip and can be achieved by selecting a rubber material (for example) as the material for the second roller's manufacture.

Figure 7A:
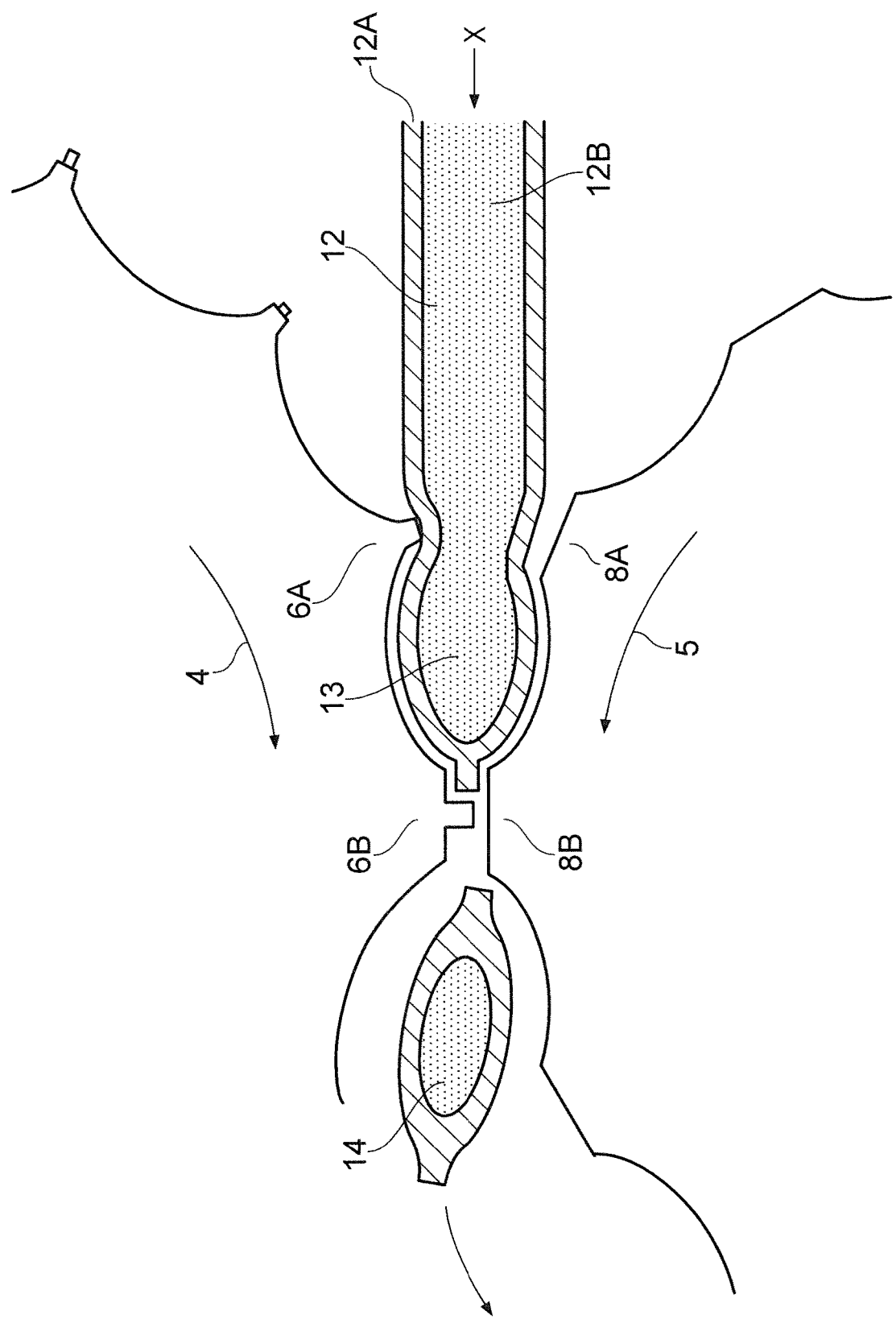
FIG. 7A illustrates a fully and partially formed parcel according an embodiment of the invention as a cross-section side elevation view through the rollers and co-extruded tube.
Figure 7B:
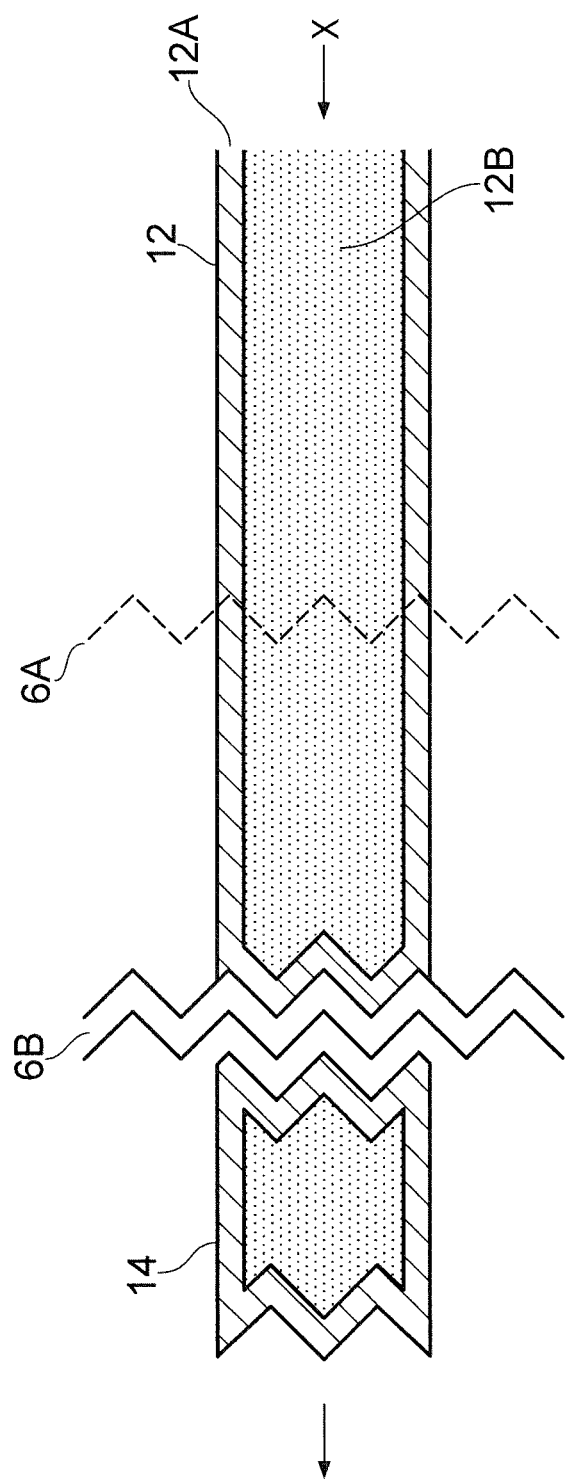
FIG. 7B illustrates a fully and partially formed parcel according to the invention as a cross-section vertical view from the cutting roller side of the apparatus.

FIGS. 7A and 7B illustrate a parcel being formed.

FIG. 7A illustrates a snap-shot of the manufacturing process in cross-section in a side elevation in a moulding mode operational (as described above). The co-extruded tube 12 comprises an outer layer 12A and inner layer 12B and is being conveyed in a direction x towards to the opposing crimping roller 4 and cutting roller 5.

It should be noted that normally it is not necessary to operate in a moulding mode to obtain a round pillow shape: when the tube enters the crimper, it is still sufficiently hot that it still retains some plasticity. Thus, the crimping operation in a non-moulding mode will naturally lead to a round pillow shape.

A blade 6A and opposing cutting surface 8A are moving towards each other as the co-extruded tube 12 moves along the axis causing the tube 12 to begin to be compressed. A preceding blade 6B and preceding cutting surface 8B have already come into contact creating a cut and seal between the partially forced parcel 13 and fully formed parcel 14 which is discharged from the apparatus.

The process operates continuously with a steady state flow of co-extruded tube 12 entering the apparatus and a plurality of formed parcels 14 being discharged from the apparatus. Each parcel has a shape as shown in FIG. 9.

FIG. 7B shows the same parcels being formed in cross-section when view in a vertical direction from the cutting roller side of the apparatus. As in FIG. 7A the tube 12 flows in the X direction. Blade 6B of the crimping rollers has compressed and cut the tube to create a cut and seal as described above. A preceding parcel 14 can be seen being ejected from the apparatus. A following blade 6A is shown as a dotted line and is approaching the tube surface to create the next cut and seal in the continuous process. Thus, by rotation of the rollers can continuously form the parcels.

Figure 8:
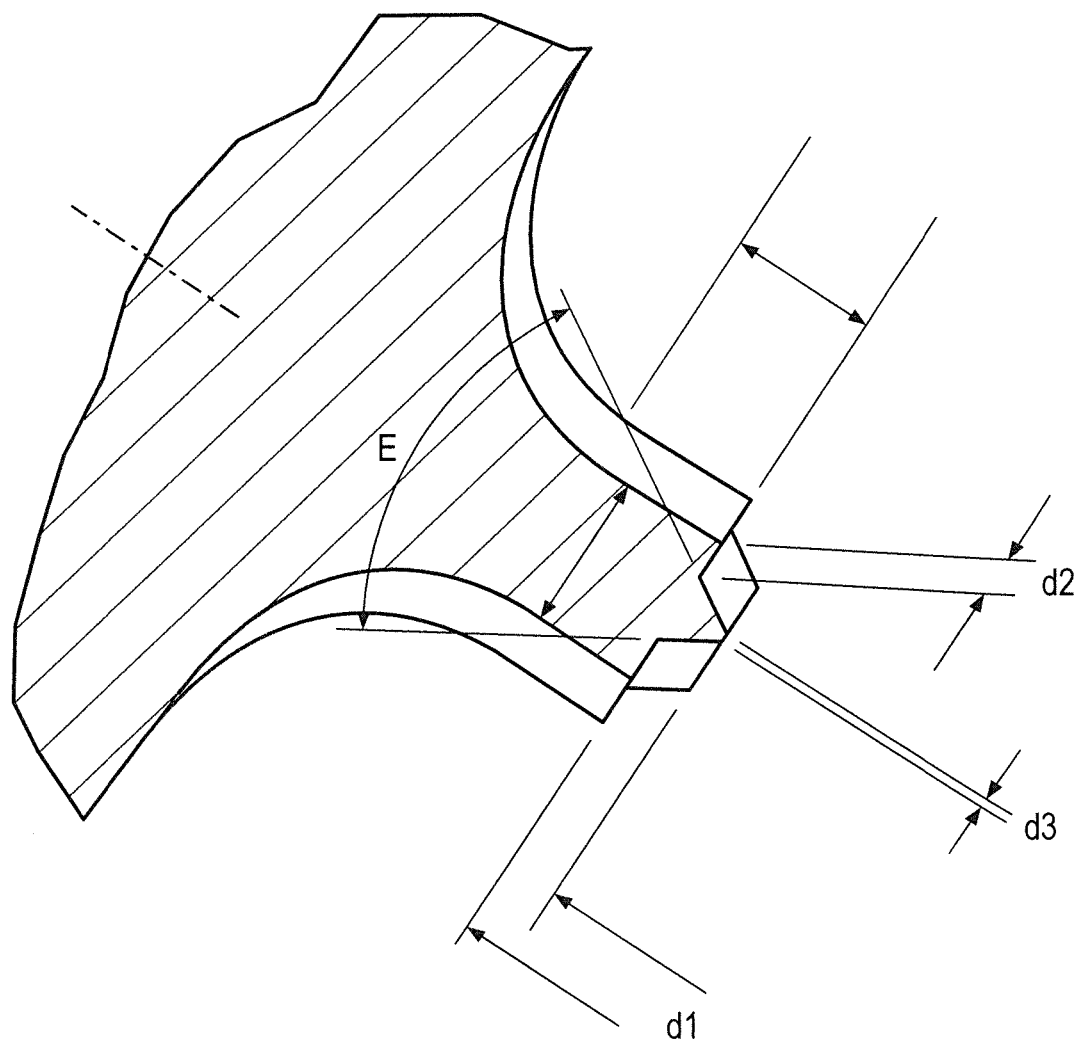
FIG. 8 shows a cross-section of a blade of the crimping roller.

FIG. 8 shows a blade 6 of the crimping roller in cross-section in more detail.

Functional ranges for the parameters shown by the reference signs in FIG. 8 are as follows:

d1 is between 0.5 mm and 2.5 mm;
d2 is between 0.2 mm and 2 mm;
d3 is between 0.05mm and 2 mm; and
angle E is between 30 and 120 degrees The invention extends to the method of manufacturing a plurality of edible parcels using the apparatus as described above. It will be recognized that the precise geometry of the blades and the ingredients selected for the co-extrusion will determine the properties of the parcels which can be produced.

Particularly, but not exclusively the apparatus may be used to manufacture a breakfast cereal of the type and shape shown in FIG. 9.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. A food product separating apparatus comprising a separating roller having a circular outer forming surface and a plurality of radially extending separating blades, each separating blade extending across a width of the separating roller, wherein each separating blade comprises a triangular cutting edge configured to form a cut in the food product and being centrally located between two sealing portions extending from opposing sides of the base of the triangular cutting edge, said sealing portions being shaped to compress a region of the food product immediately adjacent the cut, and wherein each separating blade is in the form of a plurality of alternating portions, wherein adjacent portions extend in alternating directions having an angle between 90 and 150 degrees between the adjacent portions so as to form a serrated or zig-zag profile to each blade.

2. The apparatus as claimed in claim 1, wherein each triangular cutting edge comprises corresponding alternating portions defining a serrated or zig-zag edge profile.

3. The apparatus as claimed in claim 1, wherein the radial extension of the triangular cutting edge measured from the base of the triangle is between 0.5 mm and 2.5 mm.

4. The apparatus as claimed claim 1, wherein the two sealing portions extending from the base of the triangular cutting edge extend between 0.2 mm and 2 mm from the point at which each sealing portion intersects with the base of the triangular cutting edge.

5. The apparatus as claimed in claim 4, wherein the sealing portions are each perpendicular to a radial axis passing from the centre of the roller through the centre line of the triangular cutting edge.

6. The An apparatus as claimed in claim 1, wherein the angle between each side face of the triangular cutting edge is between 30 degrees and 120 degrees.

7. The apparatus as claimed claim 1 further comprising a second roller against which the separating roller is arranged to rotate.

8. The apparatus as claimed in claim 7, wherein the centres of rotation of the separating roller and second roller are spaced by a distance that is equal to or less than the sum of the outer radius of the second roller and the outer radius of the separating roller measured to the tip of a triangular cutting edge.

9. The apparatus as claimed in claim 7, wherein the second roller comprises a flexible outer cutting surface against which the separating roller can rotate and which deforms as consecutive blades contact its outer surface.

10. A cereal manufacturing machine comprising the apparatus as claimed in claim 7, further comprising a foodstuff feed-line arranged in use to feed a stream of foodstuff between the rollers and to cause the separating roller and second roller to rotate in opposite directions with respect to one another to cause the stream of foodstuff to pass over the separating blades.

11. A method of manufacturing a co-extruded food product with a co-extruded food product separating apparatus comprising a separating roller having a circular outer forming surface and a plurality of radially extending separating blades, each separating blade extending across a width of the separating roller, wherein each separating blade comprises a triangular cutting edge configured to form a cut in the food product and being centrally located between two sealing portions extending from opposing sides of the base of the triangular cutting edge, said sealing portions being shaped to compress a region of the food product immediately adjacent the cut, and wherein each separating blade is in the form of a plurality of alternating portions, wherein adjacent portions extend in alternating directions having an angle between 90 and 150 degrees between the adjacent portions so as to form a serrated or zig-zag profile to each blade and a second roller against which the separating roller is arranged to rotate, said method comprising
    supplying a stream of food product between the separating roller and the second roller to form a plurality of individual food items from the stream of food product.

12. A co-extruded cereal manufacturing apparatus comprising a pair of opposing rollers which are arranged in use to rotate in opposing directions, at least one of said rollers comprising a plurality of cutting blades configured to cut a stream of foodstuff into a plurality of discrete parcels, wherein each cutting blade comprises:
    (a) a first radially extending portion defining a cutting edge arranged in use to cut and separate adjacent parcels; and
    (b) a pair of circumferentially extending edges on opposing sides of the first radially extending portion arranged in use to compress the foodstuff along an edge of the parcel to create a seal;
and wherein each cutting blade has portions arranged at alternating angles creating a non-linear cut and seal for each of said parcels.

13. The co-extruded cereal manufacturing apparatus as claimed in claim 12, wherein the roller not comprising the features (a) and (b) itself comprises a plurality of radially extending contact surfaces which are arranged to align with the cutting blades of the opposing roller, and wherein adjacent blades and adjacent cutting surfaces on the respective rollers define forming spaces there-between for forming the body of the cereal product.

14. The co-extruded cereal manufacturing apparatus as claimed in claim 12, wherein each of the pair of circumferentially extending edges has portions arranged at alternating angles creating a non-linear seal for each of said parcels.

* * * * *